(12) United States Patent
Rogg

(10) Patent No.: US 10,975,850 B2
(45) Date of Patent: Apr. 13, 2021

(54) LUBRICATION SYSTEM FOR A DRIVE TRAIN OF A WIND TURBINE

(71) Applicant: Adwen GmbH, Bremerhaven (DE)

(72) Inventor: Andreas Rogg, Hamburg (DE)

(73) Assignee: ADWEN GMBH

( * ) Notice: Subject to any disclaimer, the term of this patent is extended or adjusted under 35 U.S.C. 154(b) by 0 days.

(21) Appl. No.: 16/603,887

(22) PCT Filed: Apr. 12, 2018

(86) PCT No.: PCT/EP2018/059448
§ 371 (c)(1),
(2) Date: Oct. 9, 2019

(87) PCT Pub. No.: WO2018/189326
PCT Pub. Date: Oct. 18, 2018

(65) Prior Publication Data
US 2020/0116134 A1    Apr. 16, 2020

(30) Foreign Application Priority Data

Apr. 12, 2017 (EP) .................................... 17166321

(51) Int. Cl.
*F03D 80/70* (2016.01)
*F03D 15/10* (2016.01)
(Continued)

(52) U.S. Cl.
CPC ............. *F03D 80/70* (2016.05); *F03D 15/10* (2016.05); *F05B 2260/40311* (2013.01);
(Continued)

(58) Field of Classification Search
CPC ..................... F03D 15/10; F03D 80/70; F05B 2260/40311; F05B 2260/98; F16H 57/0413; F16H 57/045; F16H 2057/02078
(Continued)

(56) References Cited

U.S. PATENT DOCUMENTS 4,669,263 A * 6/1987 Sugiyama ............... F01D 25/18
 184/6.11
5,034,638 A * 7/1991 McCabria ................ H02K 9/19
 310/54

(Continued)

FOREIGN PATENT DOCUMENTS

CN         1918404 A      2/2007
CN       202690375 U      1/2013
(Continued)

OTHER PUBLICATIONS

PCT International Search Report for International Application No. PCT/EP2018/059448, dated Jul. 5, 2018.
(Continued)

*Primary Examiner* — Pedro J Cuevas
(74) *Attorney, Agent, or Firm* — Schmeiser, Olsen & Watts LLP

(57) ABSTRACT

A lubrication system for a drive train of a wind turbine including a gearbox is provided. The gearbox has a first stage with a first internal oil level and a second stage with a second internal oil level. The second internal oil level is at a geodetic higher level than the first internal oil level. The gearbox further includes a supply passage for supplying oil from the first stage to the second stage of the gearbox.

15 Claims, 14 Drawing Sheets

(51) Int. Cl.
*F16H 57/04* (2010.01)
*F16H 57/02* (2012.01)

(52) U.S. Cl.
CPC ........ *F05B 2260/98* (2013.01); *F16H 57/045* (2013.01); *F16H 57/0413* (2013.01); *F16H 2057/02078* (2013.01)

(58) Field of Classification Search
USPC ..................................................... 290/44, 55
See application file for complete search history.

(56) References Cited

U.S. PATENT DOCUMENTS

| | | | | |
|---|---|---|---|---|
| 5,505,112 | A * | 4/1996 | Gee | F16H 57/0447 180/339 |
| 6,299,561 | B1 * | 10/2001 | Kramer | F16H 57/0447 184/13.1 |
| 8,556,761 | B1 * | 10/2013 | Carlton | F16H 57/0479 475/159 |
| 8,746,405 | B2 * | 6/2014 | Perakes | F16H 57/0409 184/6.12 |
| 8,808,133 | B2 * | 8/2014 | Carlton | F16H 35/10 475/263 |
| 8,864,621 | B2 * | 10/2014 | Phebus | F16H 1/46 475/346 |
| 9,335,317 | B2 * | 5/2016 | Matsubara | G01M 13/04 |
| 9,353,800 | B2 * | 5/2016 | Carlton | F16D 9/06 |
| 9,920,828 | B2 * | 3/2018 | Fast | F16H 57/037 |
| 10,006,442 | B2 * | 6/2018 | Deicke | F03D 1/06 |
| 10,036,467 | B2 * | 7/2018 | Keane | B60B 35/16 |
| 10,458,517 | B2 * | 10/2019 | Slesinski | F16H 57/0457 |
| 10,605,331 | B2 * | 3/2020 | Slesinski | F16H 57/0441 |
| 10,760,673 | B2 * | 9/2020 | Watanabe | F16H 57/0479 |
| 2007/0169583 | A1 | 7/2007 | Reis et al. | |
| 2009/0107769 | A1 * | 4/2009 | Sato | B60K 6/405 184/6.2 |
| 2009/0200114 | A1 * | 8/2009 | Bagepalli | F03D 80/70 184/6.22 |
| 2011/0150655 | A1 * | 6/2011 | Tietze | F03D 80/70 416/170 R |
| 2011/0286844 | A1 * | 11/2011 | Takayanagi | F16H 57/0413 416/95 |
| 2012/0211307 | A1 * | 8/2012 | Nielsen | F03D 80/70 184/4 |
| 2013/0001017 | A1 * | 1/2013 | Saenz de Ugarte Sevilla | F03D 80/70 184/6.12 |
| 2013/0319150 | A1 * | 12/2013 | Carlton | F16D 9/06 74/411 |
| 2013/0324354 | A1 * | 12/2013 | Phebus | F16H 1/2818 475/348 |
| 2014/0007657 | A1 * | 1/2014 | Matsubara | G01M 13/04 73/53.05 |
| 2014/0323262 | A1 * | 10/2014 | Carlton | F16D 9/06 475/263 |
| 2015/0258885 | A1 | 9/2015 | Ideshio et al. | |
| 2020/0124033 | A1 * | 4/2020 | Rogg | F03D 15/00 |
| 2020/0292053 | A1 * | 9/2020 | Tokozakura | F16H 57/0441 |

FOREIGN PATENT DOCUMENTS

| | | |
|---|---|---|
| CN | 204942504 U | 1/2013 |
| CN | 205298483 U | 6/2016 |
| CN | 205780784 U | 12/2016 |
| CN | 110475969 A | 11/2019 |
| DE | 102011080359 A1 | 12/2012 |
| EP | 2246562 A2 | 11/2010 |
| EP | 2538044 A1 | 12/2012 |
| EP | 2541057 A1 | 1/2013 |
| EP | 3040553 A1 | 7/2016 |
| WO | 2018189328 A1 | 10/2018 |

OTHER PUBLICATIONS

Non-English Chinese Office Action for Application No. 201880024594.6, dated May 20, 2020.
Non-English Chinese Office Action for Application No. 201880024594.6, dated Dec. 28, 2020.

* cited by examiner

LUBRICATION SYSTEM FOR A DRIVE TRAIN OF A WIND TURBINE

CROSS-REFERENCE TO RELATED APPLICATIONS

This application claims priority to PCT Application No. PCT/EP2018/059448, having a filing date of Apr. 12, 2018, which is based off of EP Application No. 17166321.4, having a filing date of Apr. 12, 2017, the entire contents both of which are hereby incorporated by reference.

FIELD OF TECHNOLOGY

The following relates to a lubrication system for a drive train of a wind turbine comprising a gearbox with two or more stages.

BACKGROUND

Drive trains for wind turbines as well as drive trains with a two-stage gearbox are well known.

Wind turbines are commonly set up and operated in remote locations that cannot be reached quickly, for example wind turbines that are part of an off-shore wind park. Therefore, wind turbines need a lubrication system that provides ample lubrication at all times, especially when the turbine is operated in idling without grid connection which is the case right after installation of the wind turbine, before commissioning is completed and grid connection is established or when the turbine lost connection to the grid due to other circumstances. In these situations, the lubrication of gears and bearings must be obtained without auxiliary power being available.

For this reason, drive trains usually comprise oil sumps that are configured to provide the necessary lubrication to the respective components. The problem in the gearbox is that the oil level of the gearbox oil sump is limited by the sealings on the gearbox input shaft (and output shaft) which do not allow to increase the sump level higher than the lowest point of the sealing. In a standard gearbox design, this means that only a part of the two-stage gearbox can be lubricated by the oil sump.

SUMMARY

An aspect relates to provide an improved lubrication system for a drive train of a wind turbine.

A lubrication system for a drive train of a wind turbine comprises a gearbox. The gearbox has a first stage with a first internal oil level and a second stage with a second internal oil level. The second internal oil level is at a geodetic higher level than the first internal oil level. The gearbox further comprises a supply passage for supplying oil from the first stage to the second stage of the gearbox.

The oil in the supply passage can be driven only by gravity from the first stage to the second stage of the gearbox.

The first stage and the second stage can be at least partially separated by a separation wall for the lubrication system.

The supply passage can comprise a channel in the separation wall.

The supply passage can be an external passage outside of the separation wall.

The first stage can comprise a deflection device for directing oil from the first stage to an inlet of the supply passage.

The deflection device can be located at a geodetic higher level than the second internal oil level.

The deflection device can be provided at the separation wall on the side of the first stage.

The deflection device can be a plate attached to the separation wall.

The deflection device can be a container with an open upper end which collects oil distributed by rotating gears in the first stage.

The gearbox can further comprise a backflow channel for supplying oil from the second stage to the first stage of the gearbox.

The backflow channel can be an internal backflow channel.

The backflow channel can be an external backflow channel.

The second stage can comprise an overflow device for channeling oil exceeding a maximum second internal oil level from the second stage to an inlet of the backflow channel.

The lubrication system can further comprise an oil reservoir having an outlet, a supply valve, a drain valve and a gearbox having an oil inlet and oil outlet. The oil reservoir can be coupled to the supply valve and the supply valve can be coupled to the inlet of the gearbox. The oil outlet of the gearbox can be coupled to the drain valve. The supply valve can be configured to open in an off-grid state of the wind turbine and the drain valve can be configured to close in the off-grid state of the wind turbine.

BRIEF DESCRIPTION OF DRAWINGS

Some of the embodiments will be described in detail, with reference to the following figures, wherein like designations denote like members, wherein.

DETAILED DESCRIPTION OF EMBODIMENTS

Figure 1:
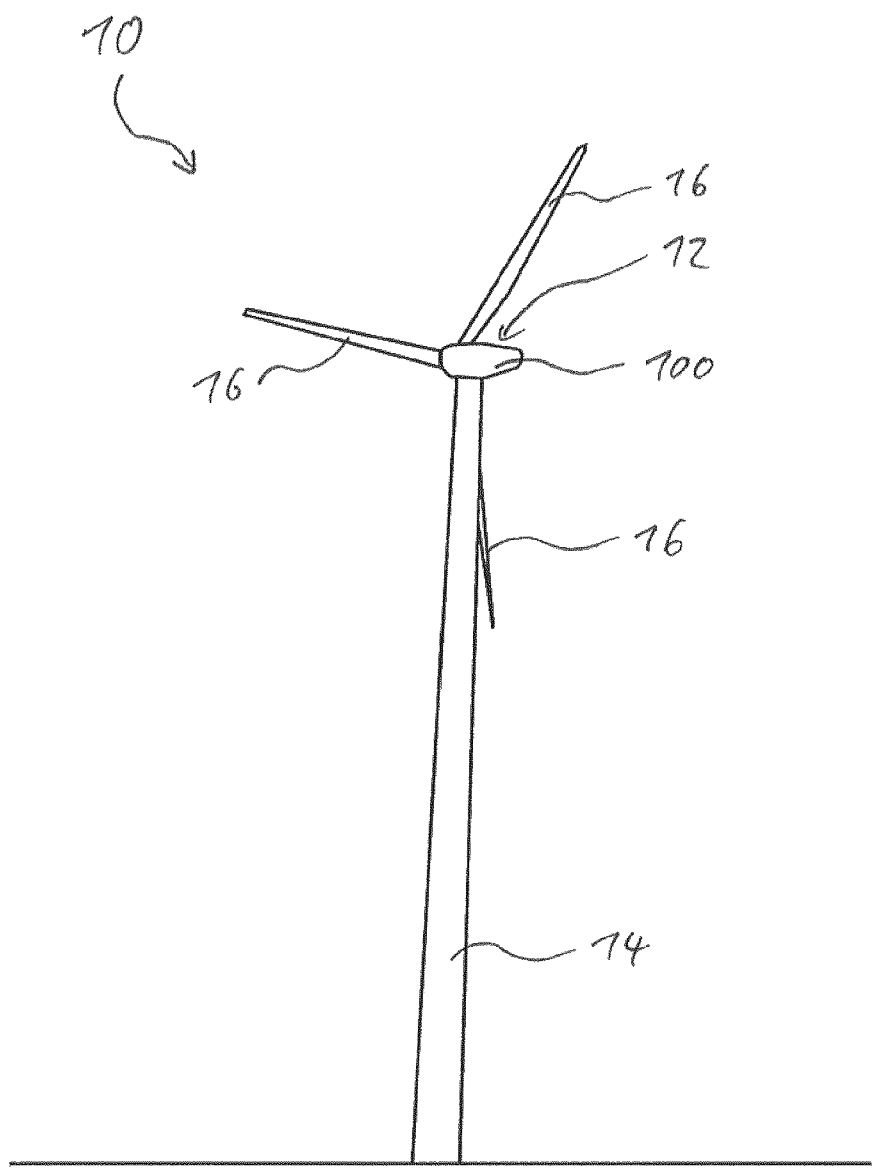
FIG. 1 is a simplified schematic drawing of a wind turbine.

FIG. 1 shows a wind turbine 10 comprising a nacelle 12 with a drive train 100 atop of a tower 14 and three rotor blades 16 drivingly connected to the drive train 100.

The wind turbine 10 can be part of a wind park, more particular an off-shore wind park.

Figure 2:
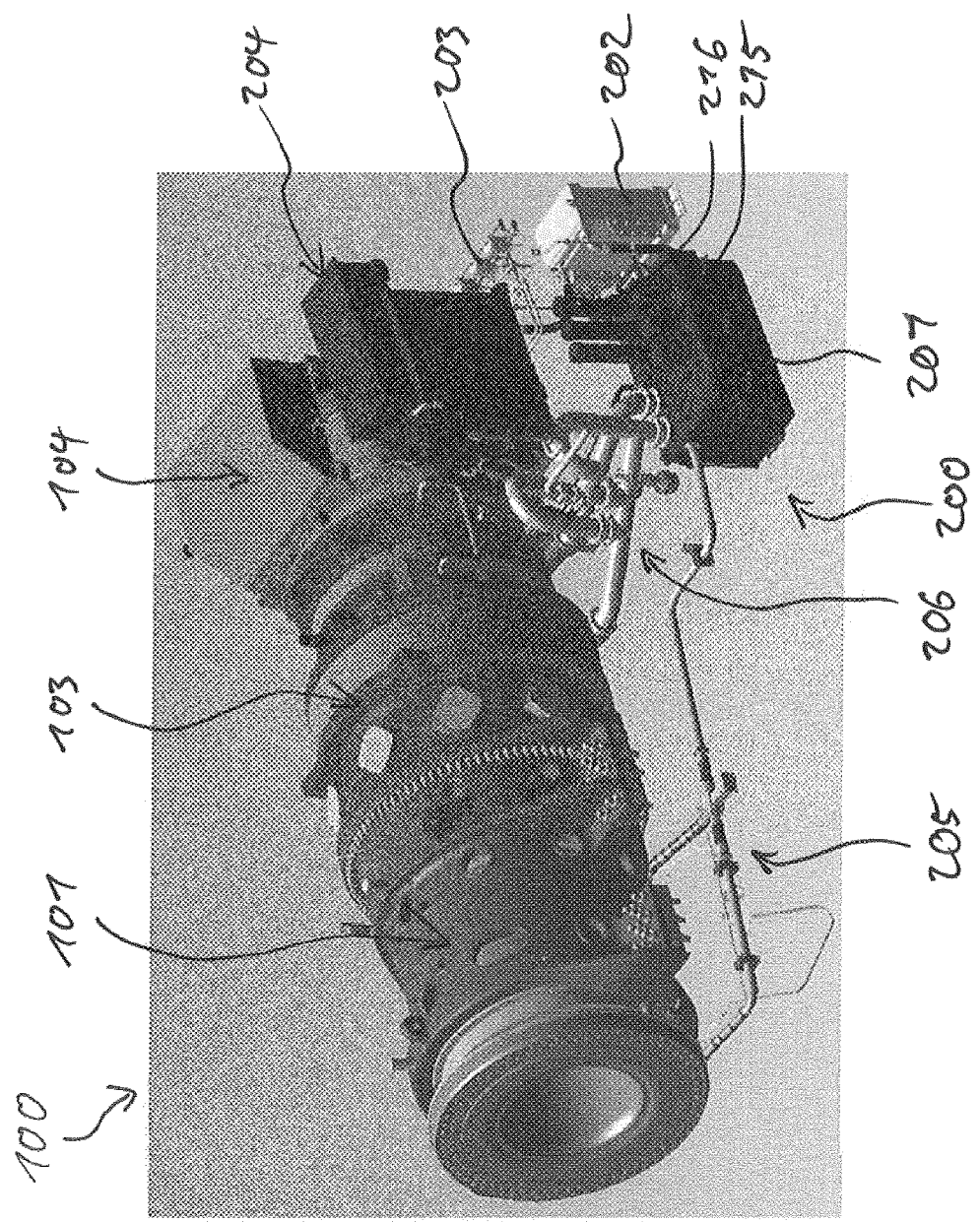
FIG. 2 is a simplified perspective view on the drive train of wind turbine of FIG. 1 comprising a lubrication system according to an embodiment of the present invention.

FIG. 2 is a simplified perspective view of the drive train 100 comprising a lubrication system 200 according to an embodiment. The drive train 100 comprises a main shaft arrangement 101 including a main shaft bearing, a gearbox 103 and a generator 104. There is further a lubrication system 200 which comprises among others, a main lubrication liquid (oil) tank 201 including main oil pumps 216 and oil filters 215, a lubrication liquid-water (oil-water) heat exchanger 202, offline filters 203 and a main lubrication liquid (oil) reservoir 204, as well as several piping arrangements, as for example the return piping 205 of the main shaft bearing, and the return piping 206 of the gearbox. Furthermore, there is an oil distribution block 218 (see FIG. 3) for distributing the oil.

In this embodiment, there are three oil pumps 216 in parallel. Two pumps cover full flow and one pump is redundant. The oil pumps 216 are driven by a frequency converter (not shown). The oil flow is a function of the oil temperature. A typical or nominal value for the oil flow is 475 l/min (liters per minute). This value comprises an oil flow of 400 l/min for the gearbox 103, an oil flow of 60l/min for the main shaft bearing/arrangement 101 and an oil flow of 15 l/min for the generator bearings and high-speed stage (HSS) spline 104. There are further three filter cartridges 215 in parallel including a fine filter with a size of 10 μm and a security coarse filter having a size of 50 μm. The minimum oil volume is about 1900l (+20% air). There are further a security relief valve and air filters. The system has a 15 kW immersed heating capacity. It is configured against oil burning and the components are dimensioned for a two years maintenance period.

Figure 3:
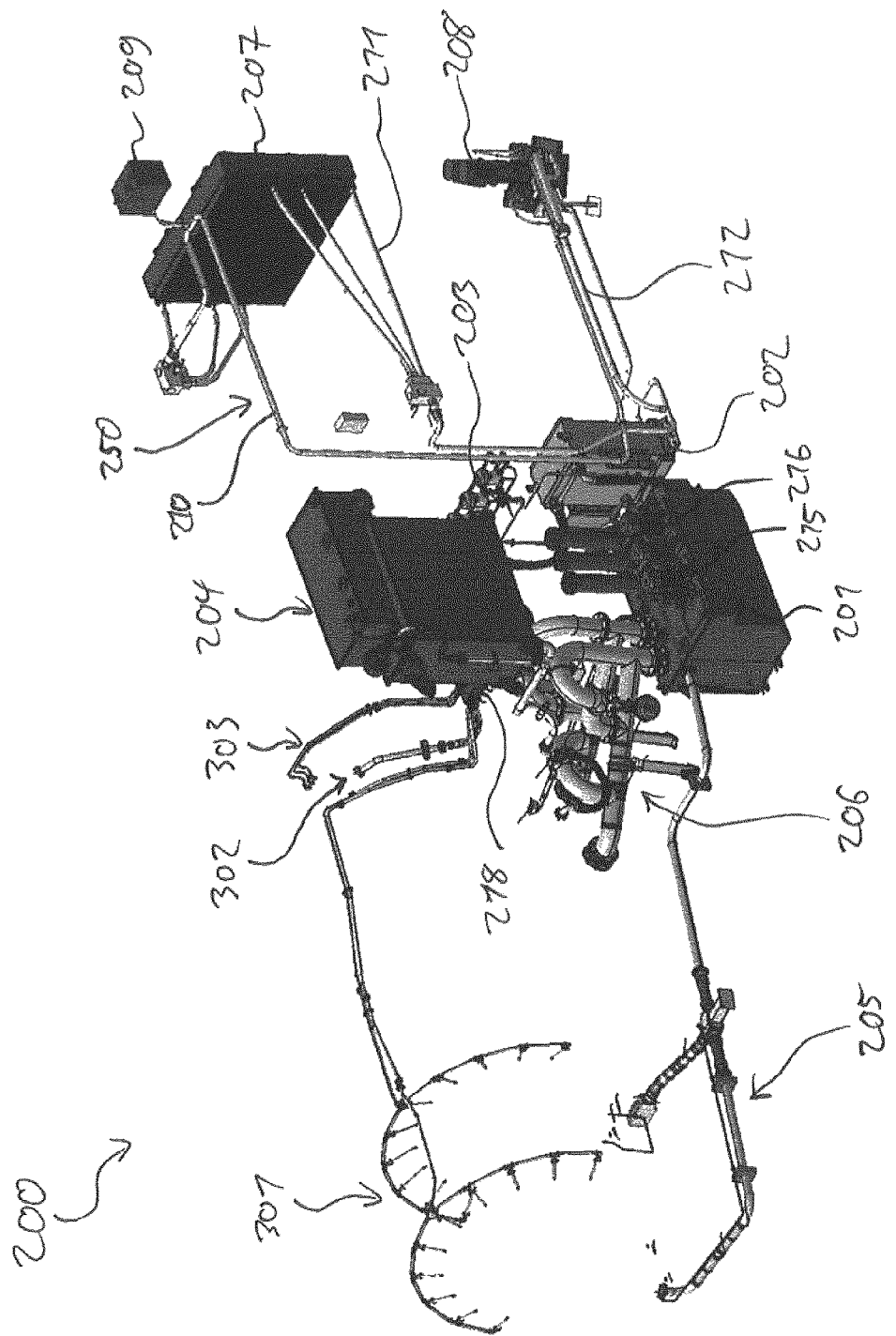
FIG. 3 is a simplified perspective view on the lubrication system of the embodiment of FIG. 2.

FIG. 3 is a simplified perspective view on the lubrication system 200 of the embodiment of FIG. 2. The lubrication system 200 is shown in more detail, while the components of the drive drain 100 are omitted. There is an inlet piping 301 for the main shaft bearing, an inlet piping 302 for the gearbox and an inlet piping 303 for the generator. There is also a fluidic circuit 250 for a liquid, water-glycol that serves to heat or cool the lubrication liquid, i.e. the oil. The fluidic circuit 250 comprises a water-glycol/air heat exchanger 207, a reservoir for the water-glycol 209, a pump 208 for the fluidic circuit 250 and some piping 210, 211 and 212 for coupling the water-glycol/air heat exchanger 207, the reservoir 209 and the pump 208 to each other and to the oil/water heat exchanger 202 for heating or cooling the oil.

The oil heating process after a cold start-up of the wind turbine comprises the following stages. Initially, the temperature of the oil inside the main oil tank 201 is greater than minus 10° C. and lower than plus 10° C. The 15 kW immersed heaters of the main oil tank 201 are started. The offline pump is started to stir the oil. At this stage, there is no oil pumped to the components of the drive train 100, i.e. to the gearbox 103, the main shaft bearings 101 and the generator 104. In the water-glycol circuit 250, the water-glycol circuit pump 208 starts and a 30 kW water-glycol heater 207 starts. The temperature of the water-glycol is regulated between 30° C. and 32° C. A water-glycol thermostatic valve is closed (valve range 35° C. to 40° C.). The oil temperature inside the main oil tank 201 is then greater than 10° C. and lower than 35° C. The main pump 216 starts supplying oil to the gearbox 103 according to its programmed ramp (predetermined scheme). The pumped oil is heated in the heat exchanger 202 and oil is fed to the gearbox 103, the main shaft bearings 101 and the generator and spline 104 with a temperature of about 30° C. to 32° C.

The oil cooling process is the usual status during turbine power generation (production mode or run-connected operating mode). The oil temperature measured in the distribution manifold block 218 is above 35° C. The main pump 216 continues supplying oil to the gearbox 103 according to its programmed ramp (predetermined scheme). The 15 kW immersed heaters are off. In the water-glycol circuit 250, the 30 kW water heater 207 is off. The thermostatic valve starts opening at 35° C. and it is fully opened at 40° C. Cooler fans start operating gradually at 40° C. All cooler fans are at full speed below 45° C.

The components of the lubrication system 200 are generally coupled in fluidic communication in order to lubricate the components 101, 103, and 104 of the drive train with lubrication liquid, in particular oil. The oil is filtered and appropriately tempered, i.e. it is heated or cooled.

The main reservoir 204 generally serves to provide oil to the drive train 100 in specific modes of operation of the wind turbine 10. The main reservoir 204 is split in two reservoirs 214, 224 or comprises two reservoirs 214, 224 (see FIG. 4). In this embodiment, there is a first reservoir 214 which is configured and coupled to supply oil to the main shaft bearing 101 and to the generator 104, and a second reservoir 224 which is configured and coupled to supply oil to the gearbox 103.

In general, the inlet for the oil supply during normal operation and from the reservoir can be different.

The second reservoir 224 has an oil outlet 306 (see FIG. 5) coupled in fluidic communication to the inlet piping 302 for the gearbox 103.

The gearbox 103 has an oil inlet 308 (see FIG. 5) coupled in fluidic communication to the inlet piping 302 and an oil outlet 310 coupled in fluidic communication to the return piping 206 of the gearbox 103.

The wind turbine 10 can have several different operating modes. Two general modes of operation can be distinguished: a normal mode and an off-grid mode.

The normal operating mode can comprise five operating modes: a run-connected mode, a run mode, a pause mode, a stop mode and an emergency mode. The following table indicates some parameters for the different modes.

TABLE 1

Operating modes of wind turbine

| Mode/Par. | Grid | rpm LSS Nom./Max | Prod. | DValve | SValve | Main Pump |
|---|---|---|---|---|---|---|
| Emergency | Yes | 0/2 | No | Closed | Closed | Low |
| Stop | Yes | 0/2 | No | Closed | Closed | Low |
| Pause | Yes | x/2 | No | Closed | Closed | Low |
| Run | Yes | x/3 | No | Open | Closed | Predet. |
| Run-con. | Yes | 9.9/14 | Yes | Open | Closed | Predet. |
| Off-grid | No | 0/2 | No | Closed | Open | No |
| Off-grid with GLS | No | 0.5 * nom | Self consumption | Closed | Open | Predet. |

Emergency mode, stop mode and pause mode are also commonly referred to as idling modes. The run-connected mode can also be referred to as production mode, as this is the only mode in which the wind turbine delivers power to the grid.

In TABLE 1 the column "Grid" indicates whether the wind turbine is connected to the grid or not. The column "rpm LSS Nom./Max" indicates the rounds per minute of the low speed stage (LSS) and in particular the nominal value and the maximum value of the rounds per minute. The column "Prod." indicates whether the wind turbine is producing or generating power, i.e. whether it is in production mode. The column "DValve" indicates whether a drain valve which is coupled between the drive train and the main tank is open or closed. The DValve is a fail safe valve that automatically closes, when it is not supplied with power. The column "SValve" relates to a supply valve that is coupled between the main reservoir 204 and the drive train 100. This type of valve is also fail safe and automatically opens, when it is not supplied with power. The column "Main Pump" relates to the main pump 216 of the lubrication circuit 200. There can also be several pumps 216 in the system.

In the emergency mode, the wind turbine 10 is coupled to the grid and has a nominal rotational speed of 0 rpm and maximum rotational speed of 2 rpm. The wind turbine 10 does not produce energy. The drain valve DValve is closed and the supply valve SValve is closed too. The main pump 216 operates but with very few rotations per minute.

In the stop mode, the wind turbine 10 is coupled to the grid and has a very low nominal rotational speed of 0 rpm and maximum rotational speed of 2 rpm. The wind turbine 10 does not produce energy. The DValve is closed and the SValve is closed too. The main pump 216 operates but with very few rotations per minute. The stop mode is comparable to the emergency mode above. But unlike the above emergency mode, the stop mode is an intentional or planned mode of operation.

In the pause mode, the wind turbine 10 is coupled to the grid and has a nominal rotational speed of x rpm and maximum rotational speed of 2 rpm. The wind turbine 10 does not produce energy. The DValve is closed and the SValve is closed too. The main pump 216 operates but with very few rotations per minute.

In the run mode, the wind turbine 10 is coupled to the grid and has a nominal rotational speed of x rpm and maximum rotational speed of 3 rpm. The wind turbine 10 does not produce energy. The DValve is open and the SValve is closed. The main pump 216 operates but with a predetermined value of rounds per minute, according to a predetermined scheme.

In the run-connected (run-con.) mode (production mode), the wind turbine 10 is coupled to the grid and the rotor (LSS) has a nominal rotational speed of 9.9 rpm and maximum rotational speed of 14 rpm. The wind turbine 10 produces energy. The DValve is open and the SValve is closed. The main pump 216 operates but with a predetermined value of rounds per minute, i.e. according to a predetermined scheme.

In the off-grid mode, the wind turbine 10 has lost the electrical connection to the grid (grid-loss). The rotor (LSS) has a nominal rotational speed of 0 rpm and maximum rotational speed of 2 rpm. The wind turbine 10 does not produce energy. The drain valve DValve is closed and the supply valve SValve is open. The main pump 216 does not operate. The off-grid mode is also an emergency mode but in combination with an off-grid situation, i.e. the wind turbine 10 has lost connection to the power grid and therefore is unable to inject and/or drain power from the grid. The off-grid mode is the only operating mode in which the drain valve DValve is closed and the supply valve SValve is open. This means that the lubrication is then performed by supplying the oil from the main reservoir 204 to components 101, 103, 104 of the drive train 100. The drain valve DValve is configured to create an oil sump in at least one component 101, 103, 104 of the drive train 100. This component can be the gearbox 103. In all the other operating modes (emergency, stop, pause, run, run-con.) where the grid connection is not lost, the main pump 216 still operates and supplies the oil to the components 101, 103, 104 of the drive train 100. Only in the off-grid mode, the main reservoir 204 is opened for supplying the components 101, 103, 104.

In the off-gird GLS mode (production mode, limited to the self-consumption of energy of the wind turbine during operation) the wind turbine 10 has lost the connection to the grid. The rotor (LSS) has an approx. 50% of the nominal rotational speed of 9.9 rpm and maximum rotational speed of 14 rpm. The wind turbine 10 produces energy. The DValve is open and the SValve is closed. The main pump 216 operates but with a predetermined value of rounds per minute, i.e. according to a predetermined scheme.

Figure 4:
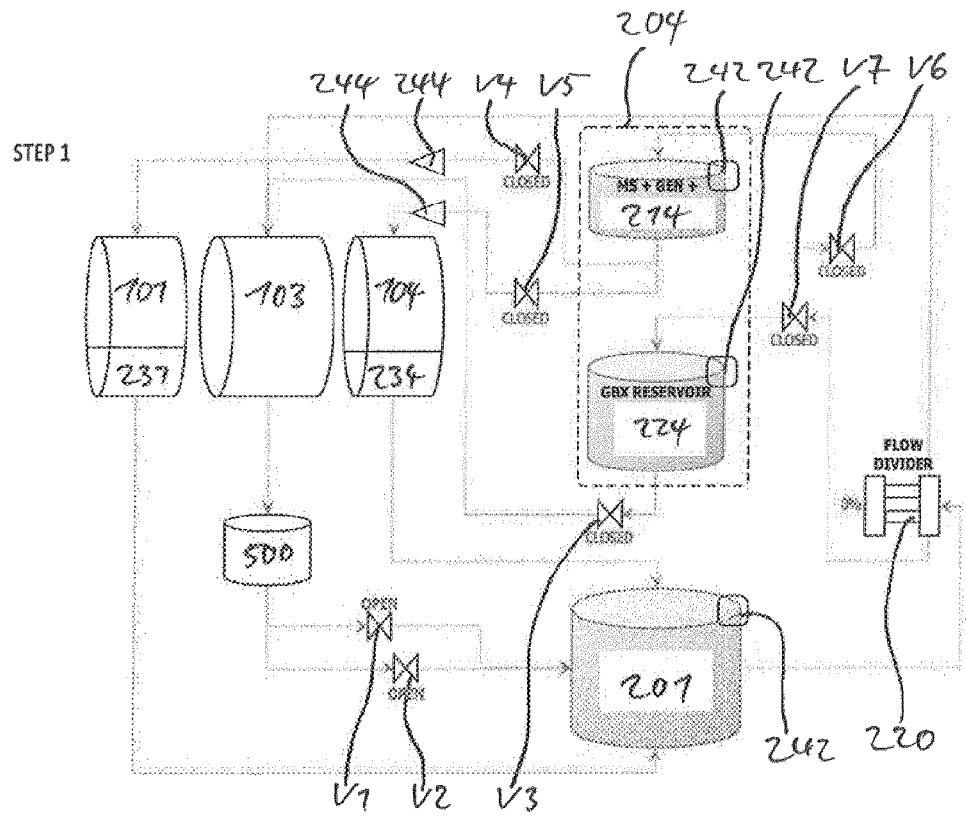
FIG. 4 is a simplified schematic hydraulic diagram illustrating the operation of the lubrication system according to embodiments for a wind turbine mode with grid-connection.
Figure 5:
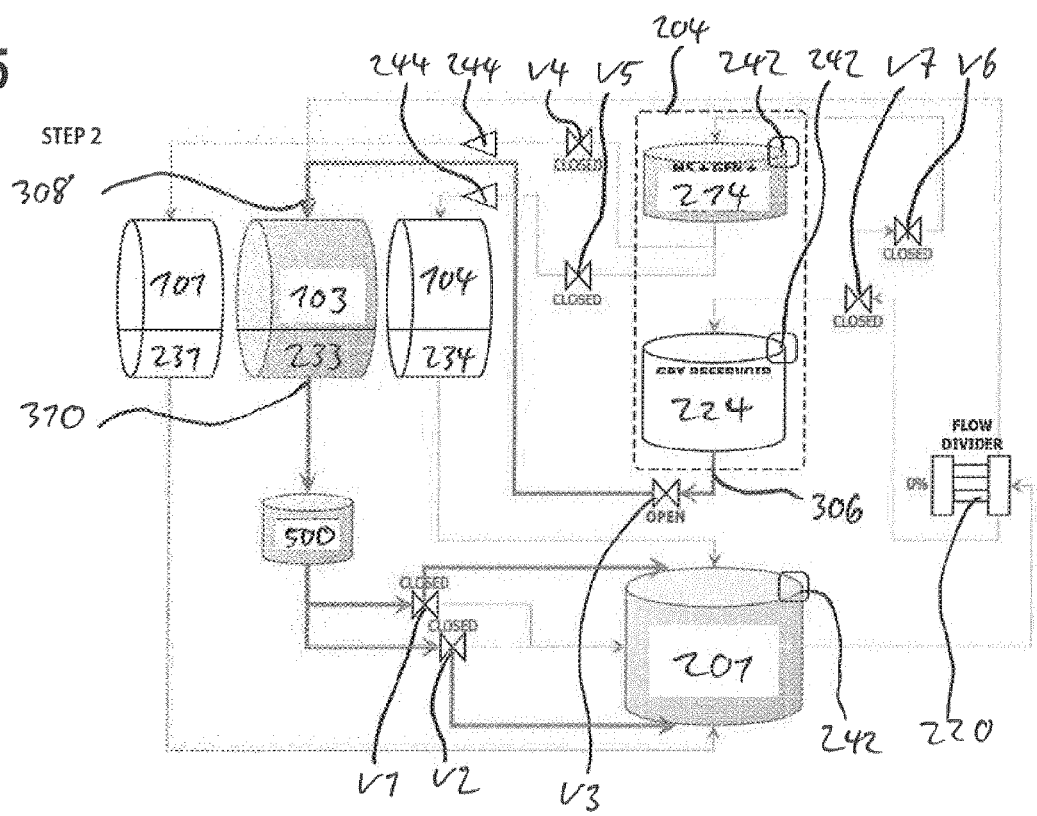
FIG. 5 is a simplified schematic hydraulic diagram illustrating the operation of the gearbox section of the lubrication system of the embodiment of FIG. 4 for a wind turbine mode without grid connection.
Figure 6:
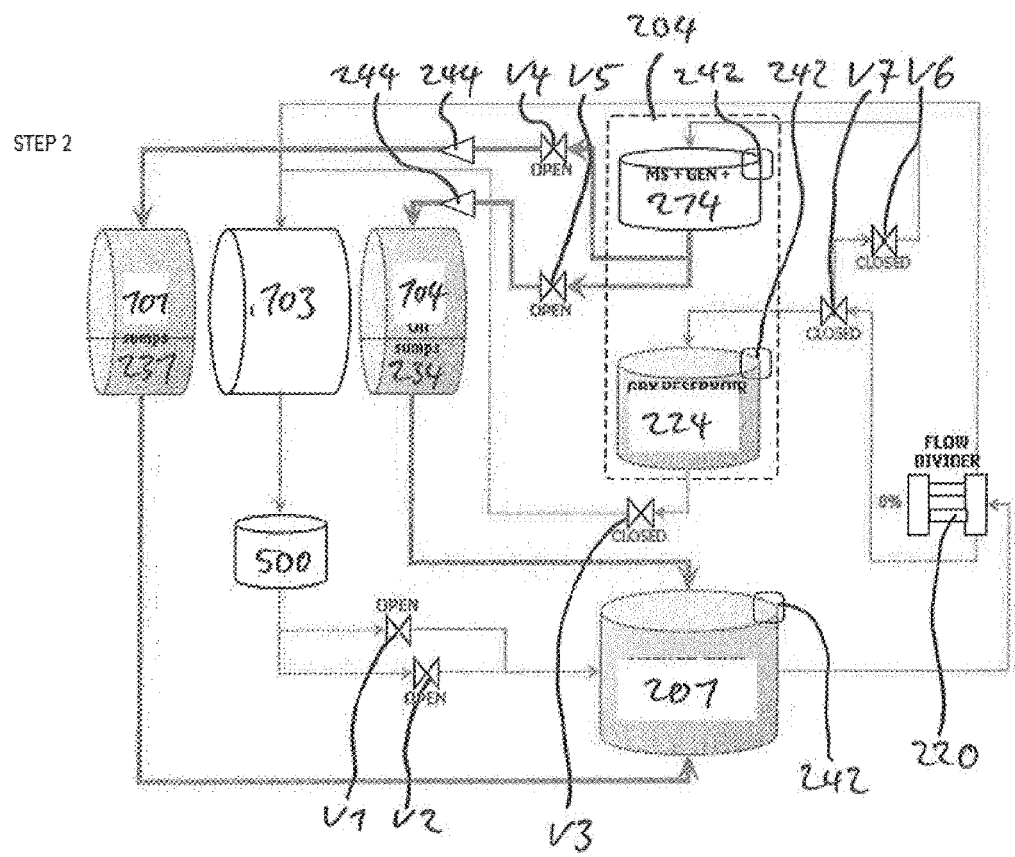
FIG. 6 is a simplified schematic hydraulic diagram illustrating the operation of the main shaft and generator section of the lubrication system of the embodiment of FIG. 4 for a wind turbine mode without grid connection.

FIGS. 4 to 6 show simplified schematic hydraulic diagrams illustrating the operation of the lubrication system 200 according to embodiments and the respective modes of the wind turbine. FIG. 4 shows the schematic hydraulic diagram when the wind turbine 10 has grid-connection, while FIGS. 5 and 6 show the schematic hydraulic diagram for the gearbox 103 section and the main shaft 101/generator section 104 respectively when the wind turbine 10 lost grid connection. Only the most relevant components for the lubricating system 200 and method of embodiments of the present invention are shown. There is the main shaft bearing 101, the gearbox 103 and the generator (and spline) 104. There is also the main oil tank 201 including the main pumps 216 and a flow divider 220. Still further there are two oil reservoirs, the first oil reservoir 214 and the second oil reservoir 224 which form together the main reservoir 204.

Furthermore there are various valves V1 to V7 and one or more siphons 500 coupled into the return piping 206 of the gearbox 103.

Valve V1 and valve V2 are coupled between the gearbox 103 oil outlet and the main oil tank 201. These two valves operate as one or more drain valves (DValve). They are fail-safe and automatically close in off-grid condition of the wind turbine 10.

Valve V3 is coupled between the oil outlet of the second reservoir (gearbox reservoir tank) 224 and the oil inlet of the gearbox 103. Valve V4 is coupled between an oil outlet of the first reservoir (main shaft, generator and spline reservoir tank) 214 and an oil inlet of the main shaft bearing 101. Valve V5 is coupled between an oil outlet of the first reservoir (main shaft, generator and spline reservoir tank) 214 and an oil inlet of the generator 104 including the spline. Valve V3, V4 and V5 are supply valves (SValve). They are fail-safe and automatically open in off-grid condition of the wind turbine 10.

In another embodiment, the valves V4 and V5 can be configured to provide the oil in certain intervals, controlled by an autonomous controller supplied from a separate energy storage, e.g. by batteries.

The flow divider 220 is generally coupled between an outlet of the main oil tank 201 and inlets of the first reservoir 214, the second reservoir 224 and the gearbox 103.

Valves V6 and V7 are coupled between the flow divider 220 and the inlets of the first reservoir 214 and the second reservoir 224, respectively. V6 and V7 only open for refilling the oil reservoirs 214, 224.

The main shaft bearing (or main shaft arrangement) 101 is generally configured to comprise a permanent internal oil sump 231.

In another embodiment, the main shaft bearing and/or the generator bearings could be configured to have additional closing valves to create the oil bath for off-grid operation.

The generator (and spline) 104 are also generally configured to comprise a permanent internal oil sump 234.

In the present embodiment, the gearbox 103 is not generally configured to comprise a permanent internal oil sump, as this would reduce the performance during normal operation.

Accordingly, there is one component, i.e. the gearbox 103 that needs a different concept for lubrication in an off-grid situation than the other components, i.e. the main shaft bearing 101 and generator 104.

TABLE 2

OFF-GRID MODE (GEARBOX TRANSITION FROM DRY TO SUMP)

| Valve | GRID | OFF-GRID |
|---|---|---|
| V1 | OPEN | CLOSED |
| V2 | OPEN | CLOSED |
| V3 | CLOSED | OPEN |
| V4 | CLOSED | CLOSED |
| V5 | CLOSED | CLOSED |
| V6 | CLOSED | CLOSED |
| V7 | CLOSED | CLOSED |

TABLE 2 indicates the states of the valves for a transition of the lubrication mode from a wind turbine mode with grid-connection (see FIG. 4) to a mode without grid connection (off-grid) (see FIG. 5), but only for the gearbox. If the connection to the grid is suddenly lost, the gearbox return line electro valves V1 and V2 are automatically closed and the valve V3 of the gearbox reservoir tank 224 outlet is automatically opened to create an oil sump 233 inside gearbox 103. One or more gearbox return line siphons 500 set a maximum oil level inside the gearbox 103. The oil pours from the gearbox reservoir tank 224 to the gearbox sump 233 and is only driven by gravity. The filling of the gearbox 103 can be controlled by level sensors 242 placed in the gearbox 103, the reservoir tank 224 and/or the main oil tank 201. Valves V4 to V7 remain unchanged in a closed state. V6 and V7 only open for refilling the oil reservoirs 214, 224.

TABLE 3

OFF-GRID MODE (MAIN SHAFT AND GENERATOR SUPPLY)

| Valve | GRID | OFF-GRID |
|---|---|---|
| V1 | OPEN | OPEN |
| V2 | OPEN | OPEN |
| V3 | CLOSED | CLOSED |
| V4 | CLOSED | OPEN |
| V5 | CLOSED | OPEN |
| V6 | CLOSED | CLOSED |
| V7 | CLOSED | CLOSED |

TABLE 3 indicates the states of the valves for a transition of the lubrication mode from a wind turbine mode with grid-connection (see FIG. 4) to a mode without grid connection (off-grid) (see FIG. 6), but only for the main shaft bearing 101 and the generator (and spline) 104. If the connection to the grid is suddenly lost, the supply valves V4 and V5 coupled between the first reservoir 214 and the inlets of the main shaft bearing 101 and the generator 104, respectively, are opened. The internal oil sumps 231, 234 of the main shaft bearing 101 and the generator 104 are refilled continuously or in intervals. The oil only drains form the reservoir 214 to the oil sumps 231, 234 of the main shaft bearing 101 and the generator 104 by gravity. There are, however, controlled drain restrictors 244 restricting the volume flow rate of the oil. The bearings of the main shaft arrangement 101 and the generator 104 are designed to comprise remaining oil sumps 231, 234 for idling situations. V1, V2, V3, V6 and V7 remain unchanged.

TABLE 4

OFF-GRID MODE (ALL)

| Valve | GRID | OFF-GRID |
|---|---|---|
| V1 | OPEN | CLOSED |
| V2 | OPEN | CLOSED |
| V3 | CLOSED | OPEN |
| V4 | CLOSED | OPEN |
| V5 | CLOSED | OPEN |
| V6 | CLOSED | CLOSED |
| V7 | CLOSED | CLOSED |

TABLE 4 indicates the states of the valves for a transition of the lubrication mode from a wind turbine mode with grid-connection (see FIG. 4) to a mode without grid connection (off-grid) for the main shaft bearing, the gearbox and the generator (combined FIGS. 5 and 6). If the connection to the grid is suddenly lost, the supply valves V4 and V5 coupled between the first reservoir 214 and the inlets of the main shaft bearing 101 and the generator 104, respectively, are opened. The internal oil sumps 231, 234 of the main shaft bearing 101 and the generator 104 are continuously refilled. The oil only drains form the reservoir 214 to the oil sumps 231, 234 of the main shaft bearing 101 and the generator 104 by gravity. There are, however, controlled drain restrictors 244. The bearings of the main shaft arrangement 101 and the generator 104 are designed to comprise remaining oil sumps 231, 234 for idling situations. The gearbox return line electro valves V1 and V2 are automatically closed and the valve V3 of the gearbox reservoir tank 224 outlet is automatically opened to create an oil sump 233 inside gearbox 103, while the one or more gearbox return line siphons 500 set a maximum oil level inside the gearbox 103. The oil pours from the gearbox reservoir tank 224 to the gearbox sump 233 and is only driven by gravity. V6 and V7 only open for refilling the oil reservoirs 214, 224 and remain therefore unchanged.

In an alternative embodiment the lubrication system 200 can comprise drain valves controlled by a separate energy storage to provide a specific volume flow from the first reservoir 214 to the main shaft 101 and/or generator 104 in certain intervals. These drain valves can be provided instead of or in addition to the drain restrictors 244.

Before the lubrication system 200 switches back to an on-grid mode, the oil reservoirs 214, 224 are refilled. The respective level sensors 242 of reservoirs 214, 224 are used to safeguard that the reservoirs 214, 224 filled and therefore able to supply oil to the main shaft bearing 101, gearbox 104 and the generator 104, in the case that the wind turbine 10 loses connection to the grid again.

In this way, the gearbox 103 is lubricated with an appropriate amount of lubrication liquid which is injected through inlet piping 302 during normal operation (on-grid mode), instead of a permanent internal oil sump which would reduce the performance due to friction losses. The oil sump 233 in the gearbox 103 is only created when the wind turbine 10 loses connection to the grid to protect the gearbox 103 during periods in which pumps 216 are not running.

In another method, the oil sump 233 in the gearbox 103 is also created when the wind turbine 10 switches to idling operation and is still connected to the grid, while the pumps 216 are running in a reduced/interval mode.

Although the main shaft arrangement 101 and the generator 104 are designed to comprise oil sumps 231, 234 at all times, oil reservoir 214 can provide a steady flow of lubrication liquid (respective an flow in intervals) to ensure that the bearings of the main shaft arrangement 101 and the generator 104 are well lubricated during periods in which pumps 216 are not running.

By providing a first oil reservoir 214 with a first amount of lubrication liquid for the main shaft arrangement 101 and generator 104 and a separate second oil reservoir 224 with a second amount of lubrication liquid for the gearbox, allows for the immediate creation of an oil sump 233 in the gearbox 103 with the second amount of lubrication liquid when the wind turbine 10 loses connection to the grid and at the same time retains the first amount of lubrication liquid to guarantee a steady supply of lubrication liquid for the main shaft arrangement 101 and generator 104, all without the need for any additional controlling means.

Also, by locating the oil reservoirs 214, 224 at a geodetic height that is higher than the oil levels of the respective oil sumps 231, 233, 234, gravity can be used as the primary, more particular the only, driving force for supplying lubrication liquid to the respective sections of the drive train 100.

In this way the lubrication system 200 is optimal for safeguarding the proper lubrication of the drive train 100 during off-grid periods and is highly failsafe.

Figure 7:
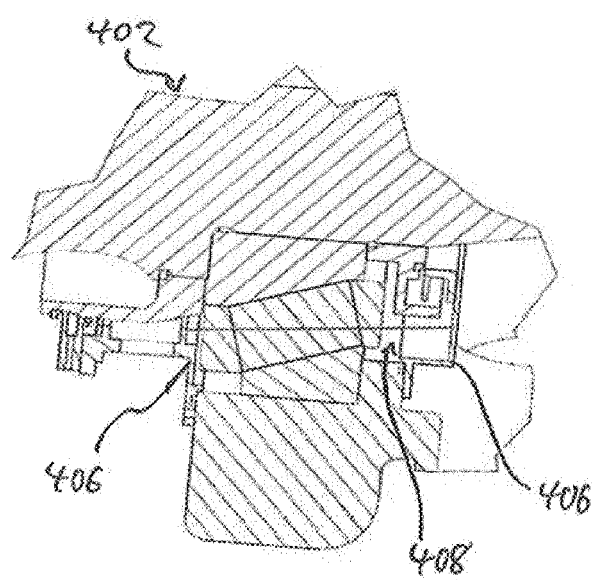
FIG. 7 is a simplified detailed sectional view of the front main bearing of the main shaft arrangement of the embodiment of FIG. 2.

FIG. 7 is a detailed view of a first section 401 of the main shaft arrangement 101 showing a front main bearing 402. The front main bearing 402 comprises labyrinth sealings 406 at opposite ends in axial direction which are designed to retain lubrication liquid and create a front bearing oil chamber 408 which contains a first part of the oil sump 231 of the main shaft 101.

Figure 8:
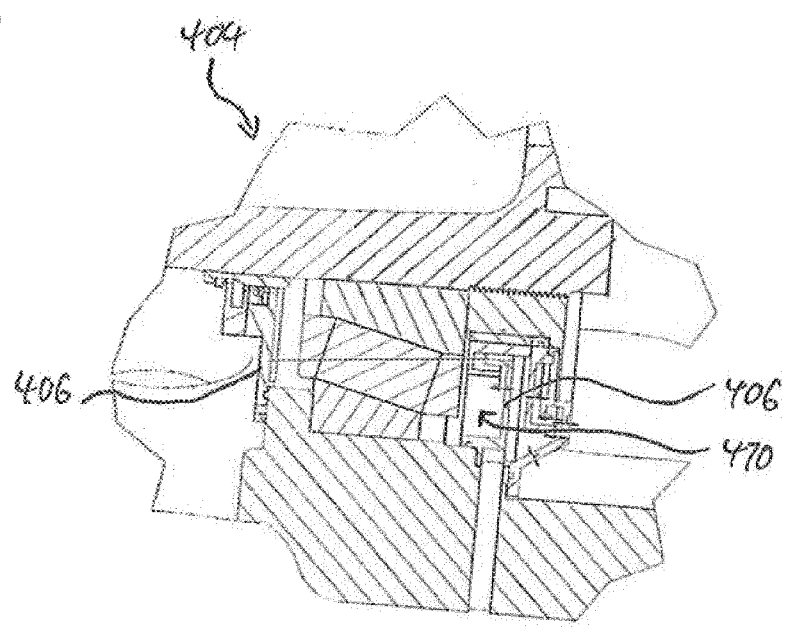
FIG. 8 is a simplified detailed sectional view of the rear main bearing of the main shaft arrangement of the embodiment of FIG. 2.

FIG. 8 is a simplified detailed view of a second section 403 of the main shaft arrangement 101 showing a rear main bearing 404. The rear main bearing 404 comprises labyrinth sealings 406 at opposite ends in axial direction which are designed to retain lubrication liquid and create a rear bearing oil chamber 410 which contains a second part of the oil sump 231 of the main shaft 101.

Figure 9:
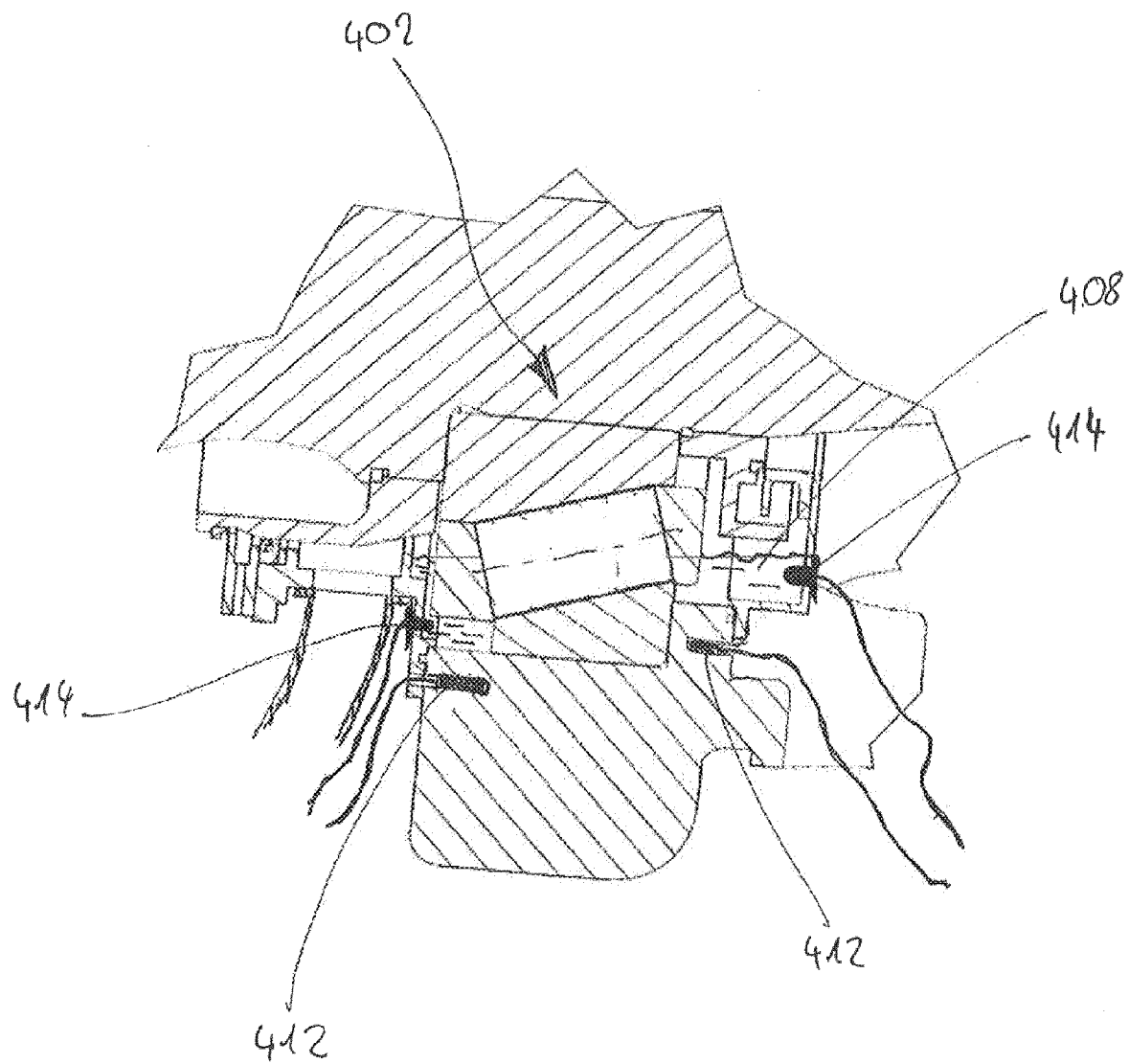
FIG. 9 is a simplified sectional view of the front main bearing of FIG. 2.

The main shaft assembly 101 comprises heaters 412 (see FIG. 9) for the front main bearing 402 which are designed to heat the lubrication liquid in the front bearing oil chamber 408.

In the same way heaters 412 are provided for the rear main bearing 404 to heat the lubrication liquid in the rear bearing oil chamber 408.

The main shaft assembly 101 further comprises separate temperature sensors 414 for the front and rear bearing oil chamber 408, 410 which are used to monitor the temperature of the lubrication liquid inside the front and rear bearing oil chamber 408, 410 respectively.

The heaters 412 are used during a cold start-up phase of the drive train 100 to increase the temperature of the lubrication liquid in the front and rear bearing oil chamber 408, 410 respectively if the temperature of the lubrication liquid is below a specific threshold, for example below 10° C. When the temperature of the lubrication liquid reaches 10-15° C. the drive train 100 is set in motion. Afterwards, the lubrication liquid is continuously heated by the heaters 412 until the temperature of the lubrication liquid reaches a set temperature in the range of 40-45° C. When this set temperature is reached the heaters 412 are switched off. The power of the heaters 412 can be reduced prior to reaching the set temperature, for example with a ramp. Further the heaters 412 can be used at any time during any mode the drive train 100 is running to increase the temperature of the lubrication liquid, especially when the temperature of the lubrication liquid falls below the set temperature.

The heaters 412 for the front and rear bearing oil chamber 408, 410 can be controlled independently from each other.

Figure 10:
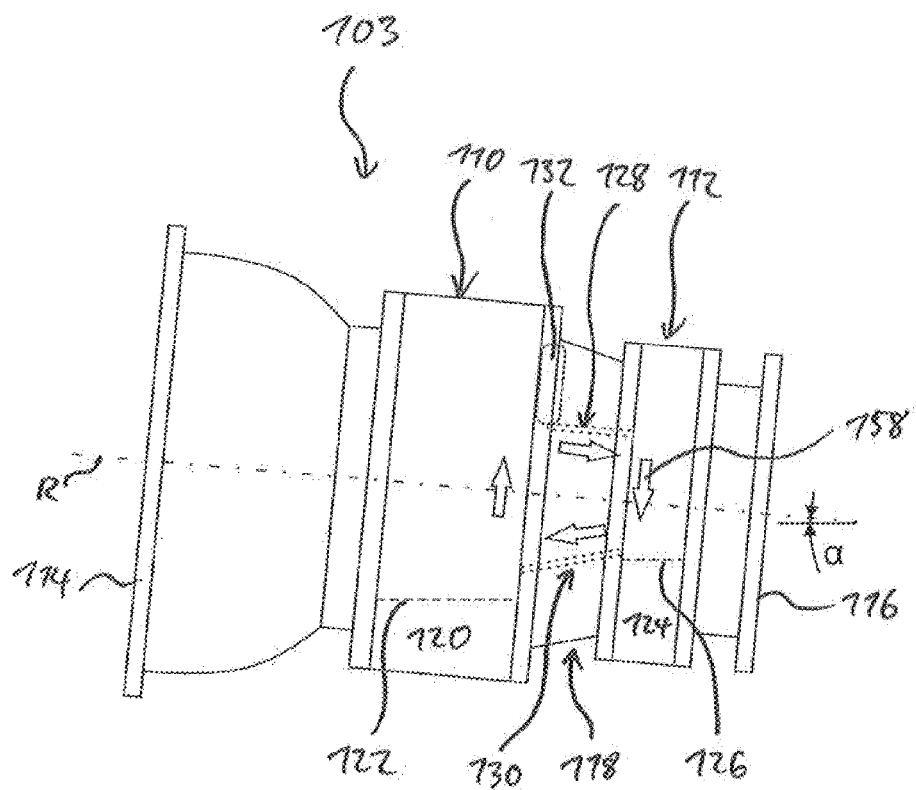
FIG. 10 is a simplified sectional view of the gearbox of the embodiment of FIG. 2, showing a deflection device and a supply passage as well as an overflow device and a backflow passage.

In one embodiment the gearbox 103 is a two stage gearbox (see FIG. 10) and comprises a planetary gear with a first stage 110 and a second stage 112. The planetary gearbox is configured to convert a slow rotary motion of the gearbox input shaft (not shown) on the main shaft side 114 of the gearbox 103 into a more rapid rotary motion of a gearbox output shaft (not shown) on the opposite generator side 116 of the gearbox 103.

The gearbox 103 is inclined to the horizontal plane by an angle α of 5°. In an alternative embodiment the angle α can be in the range of 0° and 15°.

The gearbox 103 further comprises a separation wall 118 that at least partially separates the first stage 110 from the second stage 112.

The first stage 110 has a first oil sump 120 with a first internal oil level 122 and the second stage 112 has a second oil sump 124 with a second internal oil level 126.

The first internal oil level 122 is at a geodetic lower level than the second internal oil level 126.

The separation wall 118 comprises an internal supply passage 128 for supplying lubrication liquid (oil) from the first stage 110 to the second stage 112.

The separation wall 118 further comprises an internal backflow passage 130 for supplying lubrication liquid (oil) from the second stage 112 to the first stage 110.

The supply passage 128 is located at a geodetic higher level than the backflow passage 130.

The gearbox 103 further comprises a deflection device 132 located at least at the same geodetic height as the supply passage 128 and is provided to direct oil from the first stage 110 to the supply passage 128.

In an alternative embodiment according to embodiments of the invention the supply passage 128 is at least partially an external supply passage, more particular wherein the supply passage 128 runs outside of the separation wall 118.

In a further embodiment according to embodiments of the invention the backflow passage 130 is at least partially an external backflow passage, more particular wherein the backflow passage 130 runs outside of the separation wall 118.

Figure 11:
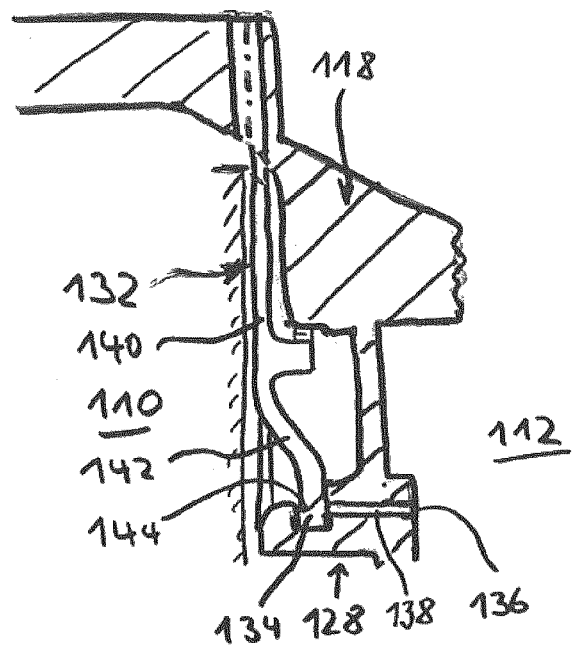
FIG. 11 is a simplified detailed view of the deflection device and supply passage of FIG. 10.

FIG. 11 shows a detailed view of the deflection device 132 as well as the supply passage 128.

The supply passage 128 has a pot shaped inlet 134 on the side of the first stage 110 and an outlet 136 on the side of the second stage 112.

The inlet 134 and the outlet 136 of the supply passage 128 are connected by a supply channel 138 which runs parallel to or declined from the rotational axis R (see FIG. 10) and inside the separation wall 118.

The deflection device 132 is attached to the separation wall 118 on the side of the first stage 110.

The deflection device 132 is a plate (see FIG. 11) with an elongated first section 140 perpendicular to the rotational axis R and positioned directly adjacent to (but not touching) the planetary gear or the planetary carrier of the first stage 110. The first section 140 transitions into a second section 142 which bends into the separation wall 118 and ends in a tip 144 located above the inlet 134 of the supply passage 128.

In this way the deflection device 132 collects oil distributed by the rotating planetary gears in the first stage 110 and directs it to the inlet 134 of the supply passage 128 where the oil is driven only by gravity from the first stage 110 to the second stage 112.

According to an alternative embodiment, the deflection device 132 can comprise a container with open upper end, more particularly with a funnel-like shape, which is designed to collect the oil distributed by the rotating planetary gears or the planetary carrier in the first stage 110.

Figure 12:
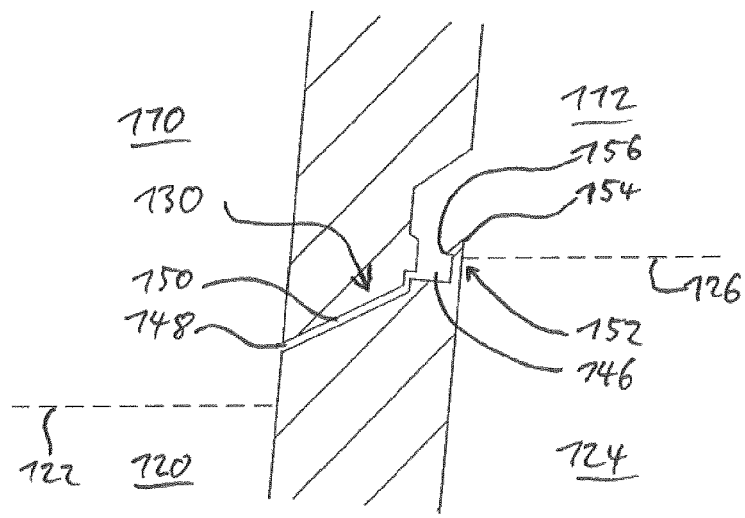
FIG. 12 is a simplified detailed view of the overflow device and backflow passage of FIG. 10.

FIG. 12 shows a detailed view of the backflow passage 130.

The backflow passage 130 has a pot shaped inlet 146 on the side of the second stage 112 and an outlet 148 on the side of the first stage 110.

The inlet 146 is located at a higher geodetic level than the outlet 148.

The inlet 146 and the outlet 148 of the backflow passage 130 are connected by a backflow channel 150.

The backflow channel 150 runs in a straight line inside the separation wall 118.

The second stage 112 comprises an overflow device 152 which extends into the separation wall 118.

The overflow device 152 has a top edge 154 that defines the maximum height of second internal oil level 126.

The overflow device 152 further comprises a drip edge 156 located below the top edge 154, above the inlet 146 of the backflow passage 130 and opposite to the second oil sump 124.

As a result of this, oil in the second stage 112 exceeding the maximum second internal oil level 126 flows over the top edge 154 and is channeled by the drip edge 156 into the inlet 146 of the backflow passage 130 where it is driven only by gravity from the second stage 112 to the first stage 110.

In this way the lubrication system for the gearbox 103 creates a lubrication fluid loop 158 (illustrated by arrows in FIG. 10) that is self-regulating, that supplies the second stage 112 with a defined oil sump 124 and that is only powered by the rotating planetary gears in the first stage 110 and gravity.

Embodiments according to embodiments of the invention are not limited to lubrication systems 200 comprising a gearbox 103 with two stages 110, 112, i.e. the gearbox 103 could comprise further stages, in particular with individual oil levels with increasing geodetic height towards the gearbox 103 output, more particular with supply and/or backflow passages 128, 130 for supplying oil from one gear stage to another, especially adjacent, gear stage.

Figure 13:
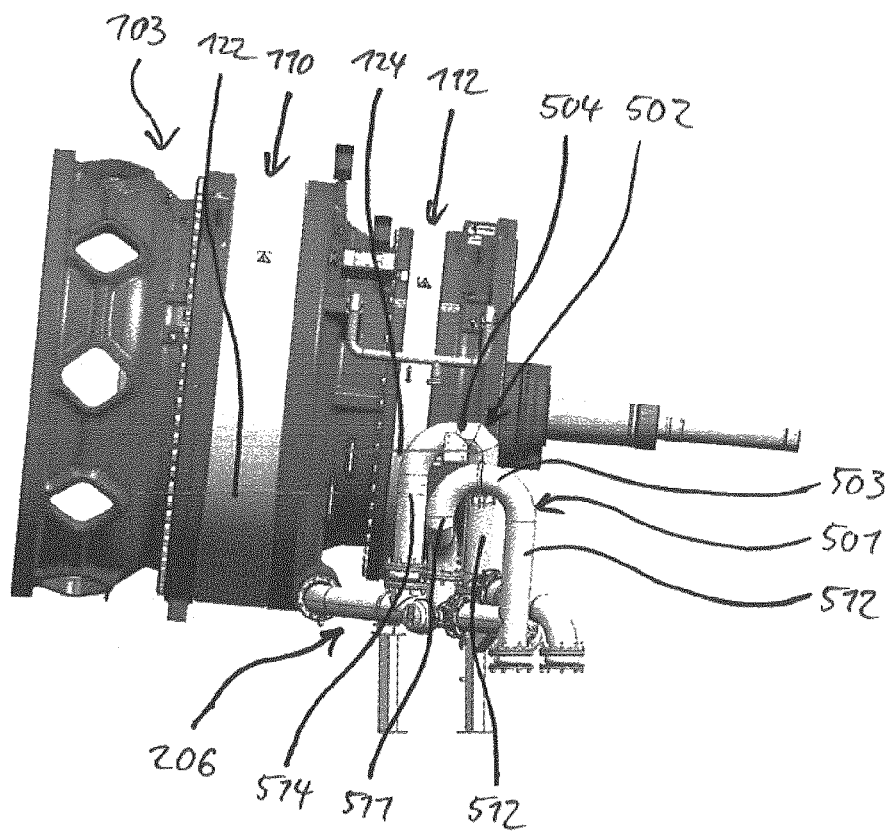
FIG. 13 is a simplified perspective view of the gearbox including its return piping of the embodiment of FIG. 2.

FIG. 13 shows a side view of the gearbox 103 and the return piping 206 with a first siphon 501 and a second siphon 502.

The first siphon 501 has an elevated part 503 between a first end 511 and a second end 512.

The second siphon 502 has an elevated part 504 between a first end 513 and a second end 514.

The gearbox 103 has a first oil outlet 311 (see FIG. 14) coupled in fluidic communication to the oil sump 120 of the first stage 110 and a second oil outlet 312 coupled in fluidic communication to the oil sump 124 of the second stage 112. The vertical line inside the gearbox 103 indicates the two oil sumps 120, 124 of the first and second stage 110, 112.

The first oil outlet 311 is located at the bottom of the first stage 110 and the second oil outlet 312 is located at the bottom of the second stage 112. The first oil outlet 311 and the second oil outlet 312 are configured to allow for completely draining the first oil sump 120 and the second oil sump 124 respectively.

In an alternative embodiment according to embodiments of the invention the first and/or second oil outlet 311, 312 (as well as any further oil outlets) of the gearbox 103 can be an oil overflow port of the gearbox 103.

The gearbox 103 is coupled via the return piping 206 to the main oil tank 201.

The main oil tank 201 has a first oil inlet 321 and a second oil inlet 322.

The return piping 206 comprises the first drain valve V1 which is coupled with a first side 331 to the first oil outlet 311 and with a second side 332 to the first oil inlet 321.

The return piping 206 further comprises the second drain valve V2 which is coupled with a first side 333 to the second oil outlet 312 and with a second side 334 to the second oil inlet 322.

The first siphon 501 is coupled with the first end 511 to the first oil outlet 311 and the first side 331 of the drain valve V1. The first siphon 501 is further coupled with the second end 512 to the second side 332 of the drain valve V1 and the first oil inlet 321. The second siphon 502 is coupled with the first end 513 to the second oil outlet 312 and to the first side 333 of the drain valve V2. The second siphon 502 is further coupled with the second end 514 to the first oil outlet 311 and the first side 331 of the drain valve V1.

Figure 15:
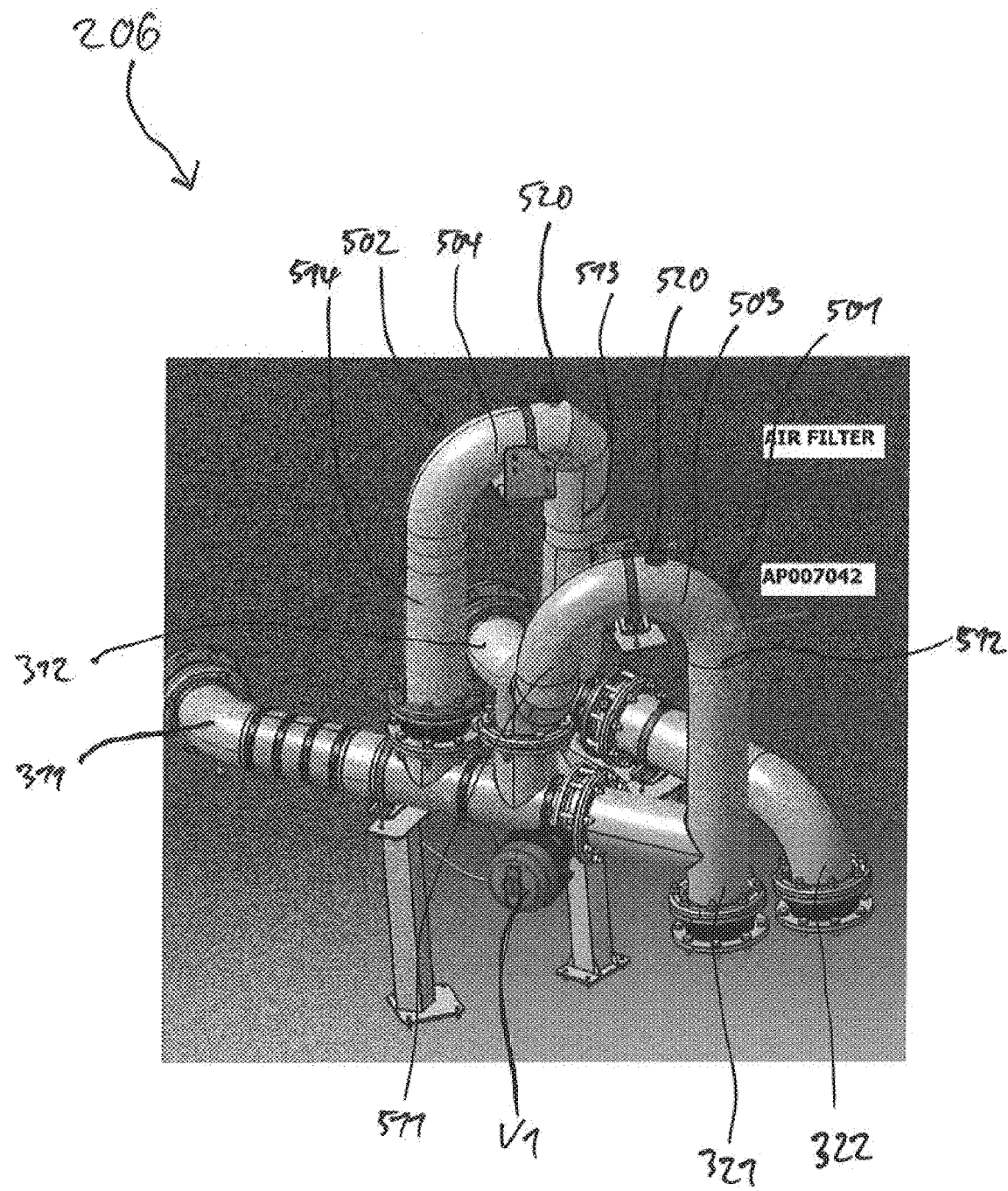
FIG. 15 is a simplified perspective view of the return piping of FIG. 13.

The first and the second siphon 501, 502 each have an air valve 520 (see FIG. 15) coupled to the respective elevated part 503, 504. The air valves 520 are designed to aerate the respective elevated part 503, 504, thereby providing an air pocket inside the respective elevated part 503, 504 that ensures the functionality of the siphons 501, 502. In other words, the first and the second siphon 501, 502 are breather siphons.

In another embodiment, the elevated parts 503, 504 of the siphons 501, 502 are connected to the air volume inside the gearbox 103 by means of hoses connected to the gearbox 103 housing.

In this way the geodetic height of the elevated part 503 of the first siphon 501 (see FIG. 13) defines the first internal oil level 122 when the drain valve V1 is closed, like during the off-grid state of the wind turbine 10.

Further the geodetic height of the elevated part 504 of the second siphon 502 defines the second internal oil level 124 when the drain valve V2 is closed, like during the off-grid state of the wind turbine 10.

Also, because the second siphon 502 is coupled with the first end 513 to the second oil outlet 312 and the second end 514 to the first oil outlet 311, the second siphon 502 provides an external backflow channel for two stage gearboxes 103 that do not comprise an internal backflow passage 130.

Figure 16:
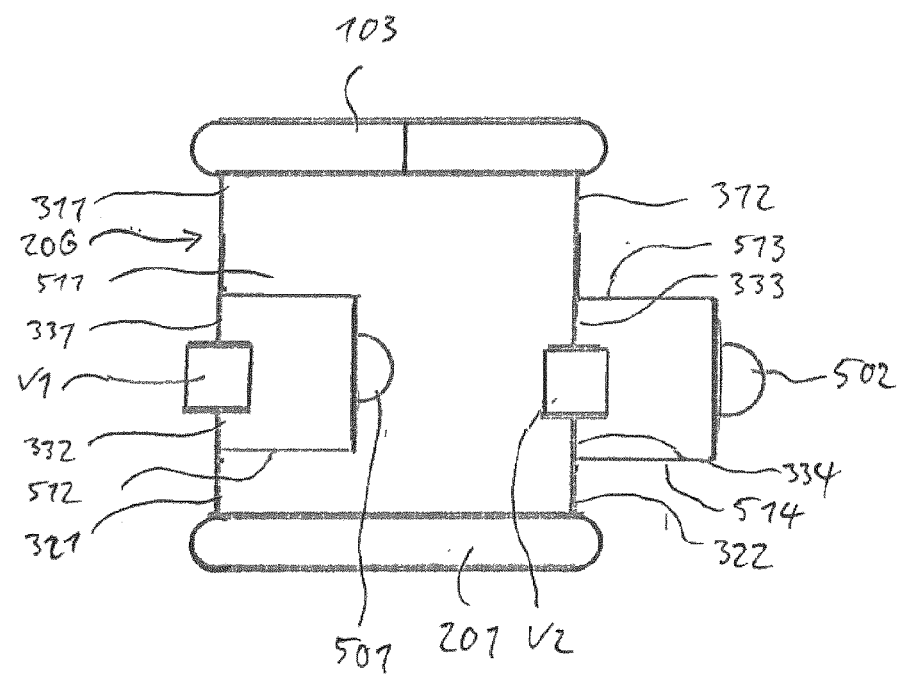
FIG. 16 is a simplified schematic hydraulic diagram illustrating the return piping of a gearbox section according to a further embodiment.

FIG. 16 shows the simplified schematic hydraulic diagram illustrating the return piping 206 according to a further embodiment of the invention.

In this embodiment the second end 514 of the second siphon 502 is coupled to the second side 334 of the drain valve V2 and the second oil inlet 322.

In this way, the oil sump 120, 124 of each stage 110, 112 is coupled independently from each other to the main oil tank 201.

Figure 17:
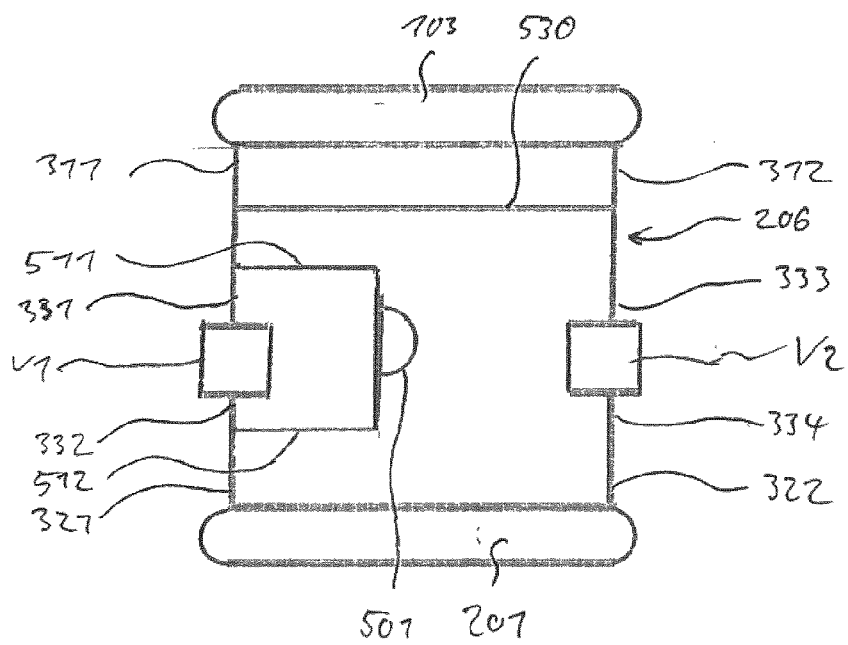
FIG. 17 is a simplified schematic hydraulic diagram illustrating the return piping of a gearbox section with a single oil level according to a further embodiment.
Figure 18:
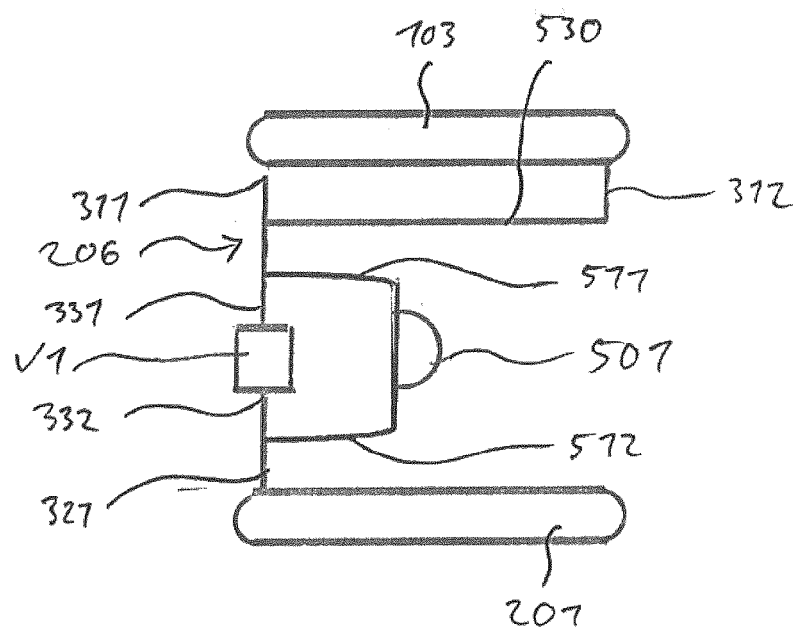
FIG. 18 is a simplified schematic hydraulic diagram illustrating the return piping of a gearbox section with a single oil level according to a further embodiment.

FIG. 17 and FIG. 18 each shows the simplified schematic hydraulic diagram illustrating the return piping 206 according to a further embodiment with a gearbox 103 that is designed with only a single oil level. This means that the lubrication system provides a single oil sump 233 in any or all stages 110, 112 of the gearbox 103.

Figure 14:
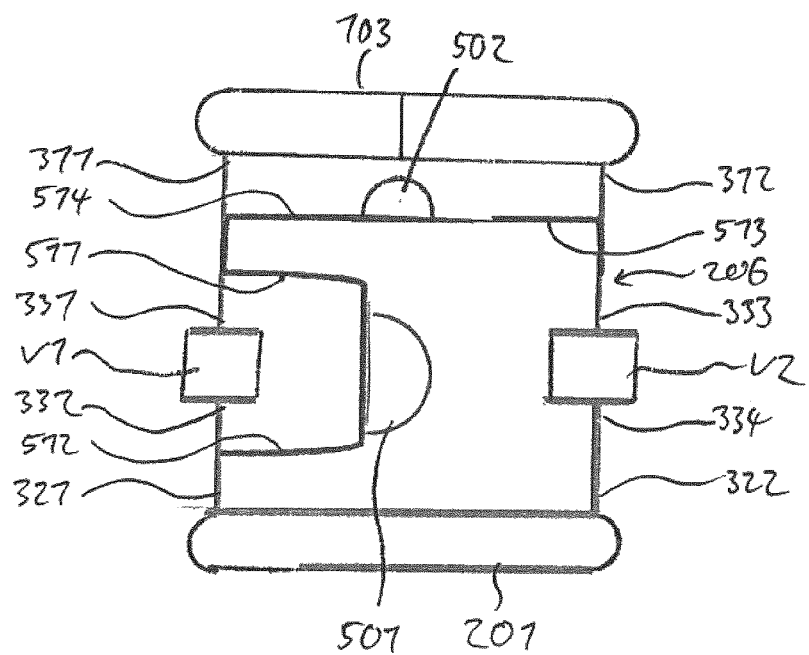
FIG. 14 is a simplified schematic hydraulic diagram illustrating the return piping of the gearbox section according to the embodiment of FIG. 13.

The first single level hydraulic diagram shown in FIG. 17 is comparable to the hydraulic diagram shown in FIG. 14. But in place of the second siphon 502 the return piping 206 has a pipeline 530 that is coupled in fluidic communication to the first oil outlet 311 and the second oil outlet 312.

The second single level hydraulic diagram shown in FIG. 18 is comparable to the hydraulic diagram shown in FIG. 17 but lacks the second path with drain valve V2. So that the second oil outlet 312 is coupled in fluidic communication only to the first oil inlet 321 of the main oil tank 201.

Figure 19:
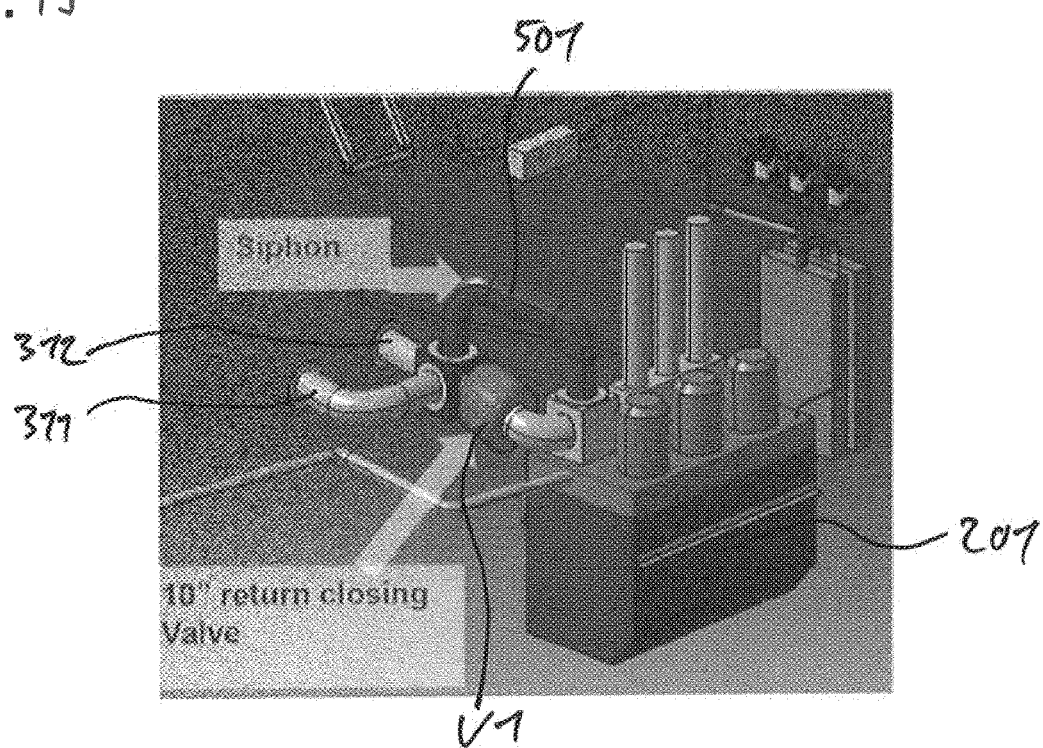
FIG. 19 is a simplified perspective view of the return piping of the gearbox section according to the embodiment of FIG. 18.

FIG. 19 shows a perspective view of the return piping 206 of FIG. 18 that only comprises a single drain valve, i.e. drain vale V1 and a single siphon, i.e. siphon 501.

In this way a simple, compact and cost-efficient return piping 206 can be provided for a gearbox 103 with a single oil level 233.

In all above embodiments according to embodiments of the invention the return piping 206 can be coupled to a single oil inlet 321, 322 of the main oil tank 201.

Figure 20:
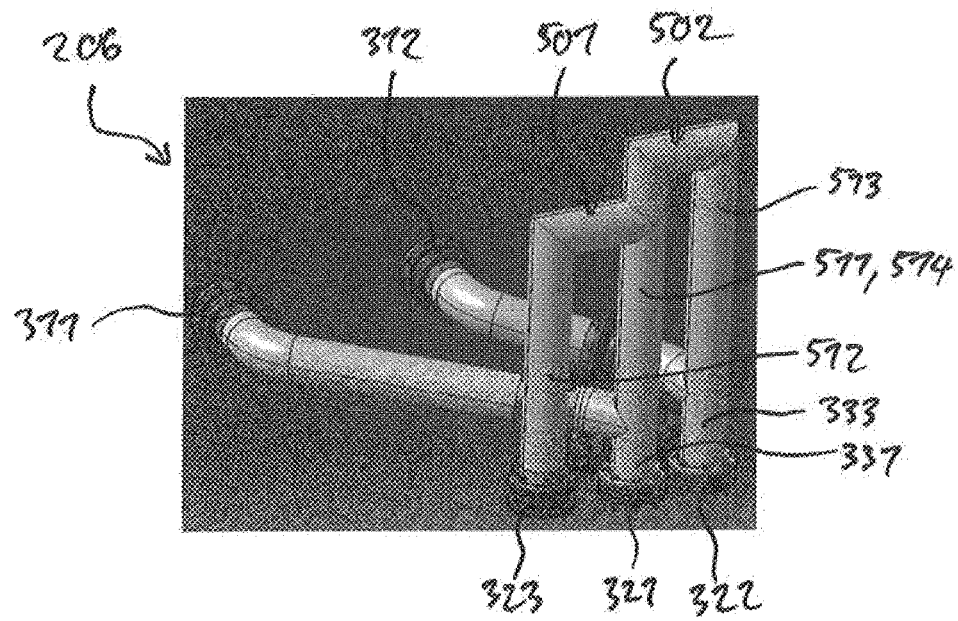
FIG. 20 is a simplified perspective view of the return piping of the gearbox section according to a further embodiment.
Figure 21:
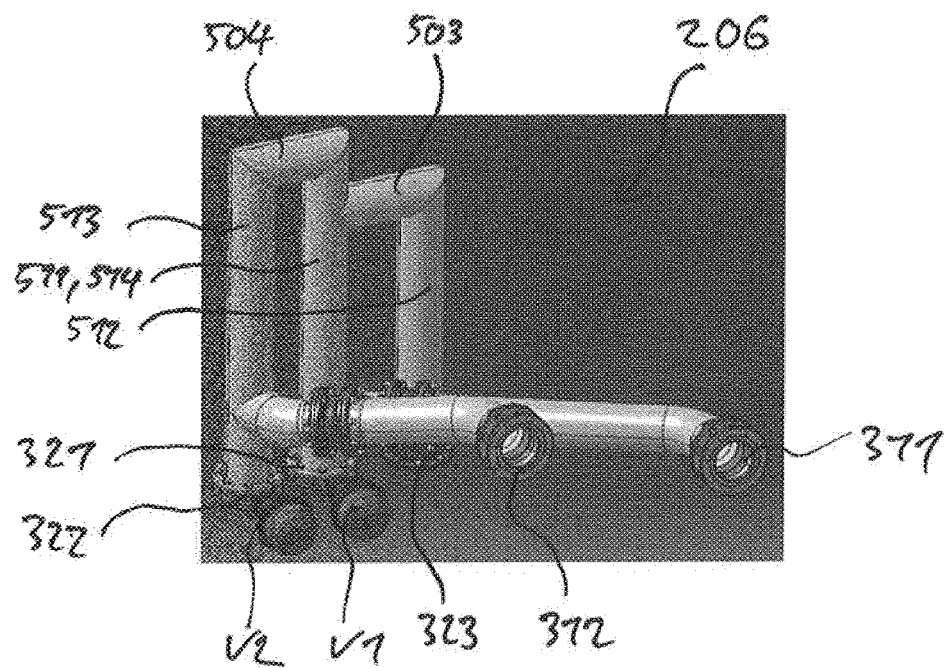
FIG. 21 is a simplified perspective view of the return piping of the gearbox section according to the embodiment of FIG. 20.

FIGS. 20 and 21 show a further embodiment of the return piping 206 of the gearbox 103 section in a front view and a rear view respectively.

In this embodiment the main oil tank 201 (not shown) has a third oil inlet 323.

The first siphon 501 is coupled with the first end 511 to the first oil outlet 311 and the first side 331 of the drain valve V1. The first siphon 501 is further coupled with the second end 512 to the third oil inlet 323. The second siphon 502 is coupled with the first end 513 to the second oil outlet 312 and to the first side 333 of the drain valve V2. The second siphon 502 is further coupled with the second end 514 to the first oil outlet 311 and the first side 331 of the drain valve V1.

The first and the second siphon 501, 502 are combined insofar as the first end 511 of the first siphon 501 is designed to be part of the second end 514 of the second siphon 502.

In this way the space requirements of the return piping 206 can be reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

Embodiments

A lubrication system for a drive train (100) of a wind turbine (10) comprising a gearbox (103), wherein the gearbox (103) has a first stage (110) with a first internal oil level (122) and a second stage (112) with a second internal oil level (126), wherein the second internal oil level (126) is at a geodetic higher level than the first internal oil level (122), and wherein the gearbox (103) further comprises a supply passage (128) for supplying oil from the first stage (110) to the second stage (112) of the gearbox (103).

The lubrication system according to embodiment 1, wherein the oil in the supply passage (128) is only driven by gravity from the first stage (110) to the second stage (112) of the gearbox (103).

The lubrication system according to embodiment 1 or 2, wherein the first stage (110) and the second stage (112) are at least partially separated by a separation wall (118) for the lubrication system.

The lubrication system according to embodiment 3, wherein the supply passage (128) comprises a channel (138) in the separation wall (118).

The lubrication system according to embodiment 3, wherein the supply passage (128) is an external passage outside of the separation wall (118).

The lubrication system according to anyone of the preceding embodiments, wherein the first stage (110) comprises a deflection device (132) for directing oil from the first stage (110) to an inlet (134) of the supply passage (128).

The lubrication system according to embodiment 6, wherein the deflection device (132) is located at a geodetic higher level than the second internal oil level (126).

The lubrication system according to embodiment 3 and embodiment 6 or 7, wherein the deflection device (132) is provided at the separation wall (118) on the side of the first stage (110).

The lubrication system according to embodiment 3 and anyone of embodiments 6 to 8, wherein the deflection device (132) is a plate attached to the separation wall (118).

The lubrication system according to embodiment 3 and anyone of embodiments 6 to 8, wherein the deflection device (132) is a container with an open upper end which collects oil distributed by rotating gears in the first stage (110).

The lubrication system according to anyone of the preceding embodiments, wherein the gearbox (103) further comprises a backflow channel (150) for supplying oil from the second stage (112) to the first stage (110) of the gearbox (103).

The lubrication system according to embodiment 11, wherein the backflow channel (150) is an internal backflow channel (150).

The lubrication system according to embodiment 11, wherein the backflow channel (150) is an external backflow channel (150).

The lubrication system according to embodiment 11 or 12, wherein the second stage (112) comprises an overflow device (152) for channeling oil exceeding a maximum second internal oil level (126) from the second stage (112) to an inlet (146) of the backflow channel (150).

The lubrication system according to anyone of the preceding embodiments, wherein the lubrication system further comprises an oil reservoir (204) having an outlet (306), a supply valve (V3), a drain valve (V1, V2) and a gearbox (103) having an oil inlet (308) and oil outlet (310), wherein the oil reservoir (204) is coupled to the supply valve (V3) and the supply valve (V3) is coupled to the inlet (308) of the gearbox (103), and wherein the oil outlet (310) of the gearbox (103) is coupled to the drain valve (V1, V2), and wherein the supply valve (V3) is configured to open in an off-grid state of the wind turbine (10) and the drain valve (V1, V2) is configured to close in the off-grid state of the wind turbine (10).

The invention claimed is:

1. A gearbox of a drive train in a wind turbine comprising a lubrication system, the gearbox comprising a first stage with a first internal oil level and a second stage with a second internal oil level, the second internal oil level being at a geodetic higher level than the first internal oil level, wherein the gearbox further comprises a supply passage for supplying oil from the first stage to the second stage of the gearbox.

2. The gearbox according to claim 1, wherein the oil in the supply passage is only driven by gravity from the first stage to the second stage of the gearbox.

3. The gearbox according to claim 1, wherein the first stage and the second stage are at least partially separated by a separation wall for the lubrication system.

4. The gearbox according to claim 3, wherein the supply passage comprises a channel in the separation wall.

5. The gearbox according to claim 3, wherein the supply passage is an external passage outside of the separation wall.

6. The gearbox according to claim 1, wherein the first stage comprises a deflection device for directing oil from the first stage to an inlet of the supply passage.

7. The gearbox according to claim 6, wherein the deflection device is located at a geodetic higher level than the second internal oil level.

8. The gearbox according to claim 6, wherein the deflection device is provided at the separation wall on the side of the first stage.

9. The gearbox according to claim 6, wherein the deflection device is a plate attached to the separation wall.

10. The gearbox according to claim 6, wherein the deflection device is a container with an open upper end which collects oil distributed by rotating gears in the first stage.

11. The gearbox according to claim 1, wherein the gearbox further comprises a backflow channel for supplying oil from the second stage to the first stage of the gearbox.

12. The gearbox according to claim 11, wherein the backflow channel is an internal backflow channel.

13. The gearbox according to claim 11, wherein the backflow channel is an external backflow channel.

14. The gearbox according to claim 11, wherein the second stage comprises an overflow device for channeling oil exceeding a maximum second internal oil level from the second stage to an inlet of the backflow channel.

15. The gearbox according to claim 1, wherein the lubrication system further comprises an oil reservoir having an outlet, a supply valve, a drain valve and a gearbox having an oil inlet and oil outlet, wherein the oil reservoir is coupled to the supply valve and the supply valve is coupled to the inlet of the gearbox, and wherein the oil outlet of the gearbox is coupled to the drain valve, and wherein the supply valve is configured to open in an off-grid state of the wind turbine and the drain valve is configured to close in the off-grid state of the wind turbine.

* * * * *